UNITED STATES PATENT OFFICE.

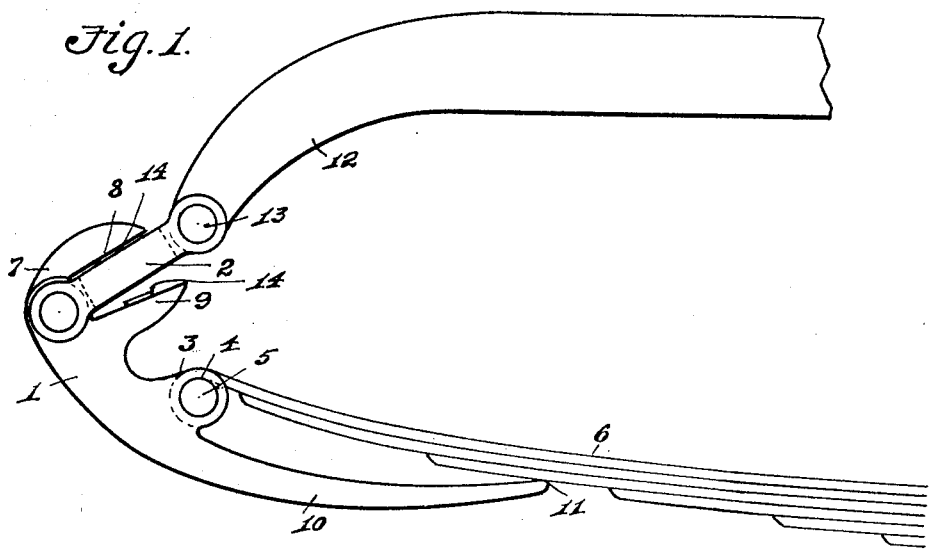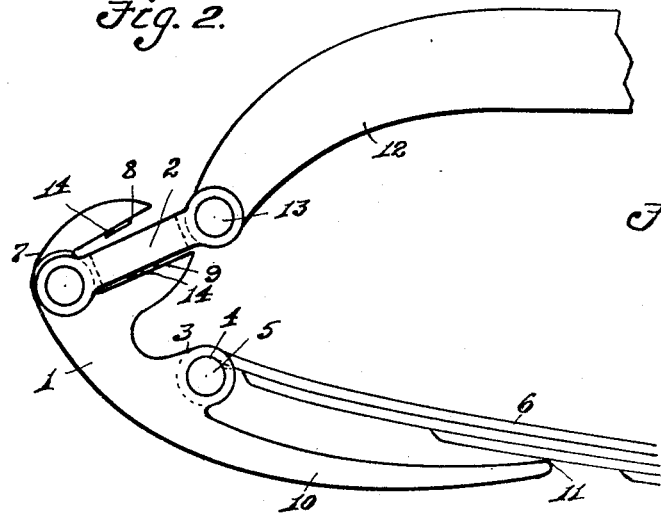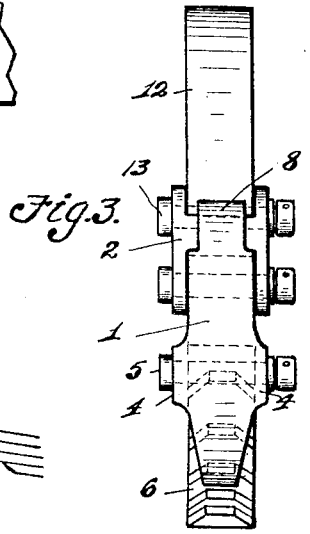

GEORGE J. OLTSCH, OF SOUTH BEND, INDIANA.

COMBINED SHOCK-ABSORBER AND REBOUND-SNUBBER FOR VEHICLE-SPRINGS.

1,350,110.  Specification of Letters Patent.  Patented Aug. 17, 1920.

Application filed October 20, 1919.  Serial No. 331,986.

*To all whom it may concern:*

Be it known that I, GEORGE J. OLTSCH, a citizen of the United States, residing at South Bend, in the county of St. Joseph and State of Indiana, have invented certain new and useful Improvements in Combined Shock-Absorbers and Rebound-Snubbers for Vehicle-Springs, of which the following is a specification.

This invention relates to a combined shock absorber and rebound snubber for vehicle springs, wherein the effective action is obtained through a combined toggle and lever movement of the parts.

The improved means is applied primarily as a connection between the frame and spring, or between the upper and lower spring sections where a full elliptic spring suspension is used, such connection serving to bring the full spring action into play under excessive shocks or a reduced length of such spring into play to snub the rebound, and this in direct ratio to the shock encountered. Furthermore, the suspension spring itself is relied on as the compensator, and the use of all auxiliary springs, friction disks, or other compensating elements as a part of the device itself is rendered unnecessary.

The connection here employed comprises a compensating lever, pivotally connected to the eye of the lower spring, and provided beyond such eye with spaced contact faces. The terminal eye of the frame, or upper suspension spring, is pivotally connected to a link, which is in turn pivotally connected to the compensating lever, so that at either limit of movement such link may engage a contact face of such lever. The lever is provided with an extension or arm which curves beneath the lower suspension spring, and terminally engages such spring a short distance from its free end. This construction provides a combined lever and toggle connection between the frame and spring, which permits the full force of the spring to be used under excessive shocks, or a limited portion thereof for slight shocks.

In the drawings:—

Figure 1 is a view in side elevation, illustrating the application of the improvement.

Fig. 2 is a similar view, showing the position of the parts under excessive shocks.

Fig. 3 is an end view of the compensating means in applied position.

The improved shock absorber and snubber is made up essentially of but two parts, as a compensating lever 1, and a link, 2. The compensating lever 1 is of the form shown, having a head end 3, formed with eyes 4, to be pivotally connected in any usual manner, as at 5, to the eye terminal of the suspension spring 6. The head end of the lever, upwardly beyond the eye 4, is formed to provide a jaw 7, having upper and lower contact faces 8 and 9. Extending from the head end 3 of the lever is an extension or lever arm 10, which underlies the suspension spring 6, on a curvature slightly greater than the normal curvature of such spring, and terminally bears against the under side of the spring at what will be hereinafter termed a fulcrum point 11. The length of the lever arm 10 is such that the fulcrum point 11 is so spaced from the free end of the spring that a comparatively few number of spring leaves are included within the length of such lever arm, or in other words, such arm traverses a portion of spring of comparatively high resiliency.

The link member 2 of the connection is of an ordinary flat type, pivotally connected at one end to the terminal of the frame 12, as at 13, the opposite end of the link being pivotally connected to the head end of the compensating lever in line with and beyond the contact faces 8 and 9, so that the body of the link will play between said faces. If desired the upper face of the link, and the lower contact face 9 of the lever may be provided with rubber bumpers, as 14, to deaden the sound of action.

As thus constructed, under excessive shocks, the link will be brought into bearing contact with the lower face 9 of the compensating lever, as shown in Fig. 2, and the full resistance of the suspension spring 6 is obtained to resist such shock. On the rebound of frame 12, the link 2 engages the upper contact face 8 of the lever, tending to move the pivotally-connected eyes 4 of the lever and of the suspension spring upwardly. However, the lever arm 10, on point 11 as a fulcrum, will force that portion of the spring included within the length of such lever arm to bend downwardly, thereby absorbing and counteracting the upward movement of the frame 12. Small shocks, as will be readily apparent are absorbed by the comparatively few spring leaves of the suspension spring included within the length of the lever arm, as such shocks act initially through the lever arm, and if such shocks are not too great, the few leaves referred to absorb the shock.

The connection constitutes in effect a toggle and lever action combined, involving but two parts, with such parts so arranged that the suspension spring itself, by leverage action on a portion of such spring, is entirely relied upon for the absorption or snubbing of the movement incident to the shock. No auxiliary springs, friction disks, or other retarding elements are necessary, so that once adjusted to the force of the particular suspension spring, effective action is had under all conditions.

Of course the parts of the improved structure are to be varied in size in accordance with the load requirements and the spring suspension of the particular vehicle. The device, as will be apparent, may be readily applied to practically all types of spring supported vehicles as at present constructed, and without change of any parts.

Having thus described the invention, what is claimed as new, is:—

1. In combination with a frame and a suspension spring, a combined shock absorber and snubber, said shock absorber and snubber comprising a compensating lever pivotally connected to the end of the suspension spring and formed beyond the spring connection with upper and lower contact faces, an arm rigid with the lever and having a fulcrumed bearing beneath the suspension spring, and a link pivotally connected to the frame and to the lever, said link operating between the contact faces.

2. In combination with a frame and a suspension spring, a combined shock absorber and snubber, said shock absorber comprising a lever pivotally connected at the end of the suspension spring and provided with upper and lower contact faces, an arm extending rigidly from said lever and having a fulcrumed bearing beneath the suspension spring remote from the free end of said spring, and a link pivotally connected to the frame and to the lever, said link bearing between and being adapted to engage either contact face of the lever.

3. The combination with a frame and a suspension spring, of a combined shock absorber and snubber, said shock absorber and snubber comprising a lever pivoted to the end of the spring at a point spaced from the ends of the lever, the inner end of the lever having a bearing on the under face of the spring, the outer end of the lever having pivoted thereto a link, said link extending upwardly and inwardly and having its upper end pivoted to the frame, said link having a freedom of movement between stops, during a flexing of the spring and rebound of the frame.

4. The combination with a frame and a suspension spring, of a combined shock absorber and snubber, said shock absorber and snubber comprising a lever pivoted to the end of the spring at a point spaced from the ends of the lever, the inner end of the lever having a fulcrumed bearing on the spring at a point spaced from the end of the spring, a link connection between the outer end of the lever and the frame, limiting stops for limiting the free movement of the link connection, the pivotal points of the lever and link of the link connection being so positioned that during a flexing of the spring the spring will be snubbed and during a rebound of the frame the spring will also be snubbed.

5. The combination with a frame and a suspension spring, of a combined shock absorber and snubber, said shock absorber and snubber comprising a lever pivoted to the end of the spring, one end of the lever having a fulcrumed bearing on the spring, a link connection between the lever and the frame, means for limiting the movement of the link connection, said link connection being so positioned that during excessive shocks the spring will be bent downwardly at its pivoted end and also bent downwardly at its pivoted end during the rebound of the frame.

6. A combined shock absorber and snubber comprising a lever arranged to be pivoted to one end of a spring, said lever engaging the spring at a point spaced from its pivoted end, the other end of the lever extending beyond the end of the spring and having a link connection with a frame, said link connection having a freedom of action during slight shocks, and means for limiting the freedom of action of the link connection during excessive shocks, and causing the bending of the pivoted end of the spring in the same direction during the upward movement of the spring and during the rebound of the frame.

In testimony whereof I affix my signature.

GEORGE J. OLTSCH.